Figure 1:
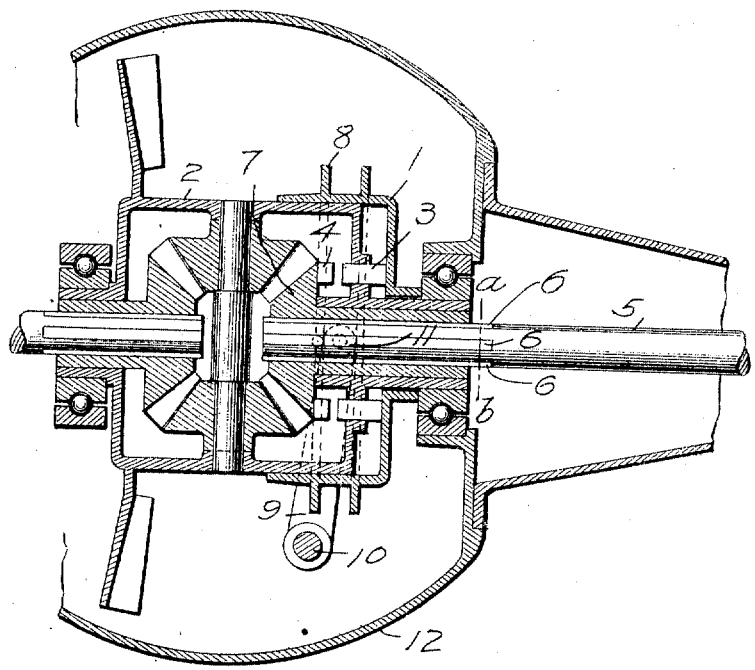

H. MAYER & G. SCHLATTER.
DEVICE FOR LOCKING THE DIFFERENTIAL GEAR IN MOTOR CARS.
APPLICATION FILED MAR. 21, 1916.

1,212,795.    Patented Jan. 16, 1917.

Inventors
Heinrich Mayer,
Gustav Schlatter,
By
Attorney

UNITED STATES PATENT OFFICE.

HEINRICH MAYER AND GUSTAV SCHLATTER, OF ARBON, SWITZERLAND, ASSIGNORS TO FIRM ADOLPH SAURER, OF ARBON, SWITZERLAND.

DEVICE FOR LOCKING THE DIFFERENTIAL GEAR IN MOTOR-CARS.

1,212,795.      Specification of Letters Patent.      Patented Jan. 16, 1917.

Application filed March 21, 1916. Serial No. 85,634.

*To all whom it may concern:*

Be it known that we, HEINRICH MAYER and GUSTAV SCHLATTER, the former a citizen of the German Empire, the latter a citizen of the Swiss Confederation, residing at Arbon, Switzerland, have invented new and useful Improvements in Devices for Locking the Differential Gear in Motor-Cars, of which the following is a specification.

This invention relates to devices for locking the differential gear in motor-driven vehicles.

The presence of a differential gear in the driving gear of motor-cars is the cause of many disagreeable occurrences when traveling, such as spinning of the wheels owing to too little adhesion, and so on. In order to prevent the same devices have heretofore been proposed for enabling the differential gear to be held and thereby preventing it from acting. The means employed heretofore, in which the displaceable part of a claw-clutch was mounted either on the hub of the casing of the differential gear, or on the shaft, and in the latter case was driven through keys by the shaft, are connected with considerable disadvantages. In the former case the clutch sleeve located between the casing of the differential gear and the bearing necessitates this bearing being located farther out or being entirely omitted. Both measures lead to enlarging the distance between the claws of the clutch and the bearing and, consequently, to an increase in the dimensions of the parts in question because greater bending moments occur. Secondly, when the displaceable part of the clutch is mounted on the shaft it is true that the bearing can be left nearer the casing of the differential gear, but as the sleeve of the clutch is located outside the bearing it is necessary to lead the casing of the differential gear or its hub through the bearing. It cannot be avoided that with the necessarily only small diameter of the clutch, the pressures on the claws become so great that the pressure per unit of area which is admissible constructively cannot always be obtained. Also, this second form has the defect that when that shaft on which the clutch sleeve is mounted is taken out, the latter falls down and, on replacing the shaft, not rarely can be found only with difficulty or may be entirely forgotten. For obviating this danger use must be made of other constructive means, such as providing another bearing for the clutch sleeve in the casing of the differential gear, and the like.

A primary object of this invention is to provide an improved device for fixing the differential gear in motor-driven vehicles, the bearings near the casing of the differential gear being retained. This end is attained by mounting the clutch sleeve on the casing of the differential gear itself and not on the hub of the same nor on one of the driving shafts. In a preferred form of the invention there is located between the bearing and the clutch sleeve only a wall of the clutch sleeve disposed at right-angles or approximately at right-angles to the axes for guiding the claws of the clutch.

The invention is applicable both to chain-driven cars and to cars having a Cardan shaft; in the latter case the locking device will be applied to the rear axle, *i. e.*, the Cardan axle.

The invention consists in the construction, arrangement and combination of parts described hereinafter and pointed out in the claims.

One illustrative embodiment of the invention is diagrammatically represented by way of example in the accompanying drawing, wherein:—

Figure 2:
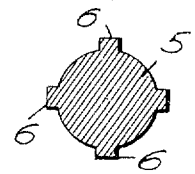

Figure 1 is a longitudinal section taken through the rear axle, the differential gear and the locking device, and Fig. 2 is a cross-section taken on the line *a—b* through the shaft.

Referring to the drawing, the clutch member 1 is displaceably mounted on the casing 2 of the differential gear. The claws 3 of the member take through holes in the casing 2 and can engage with the claws 4 of a bevel gear wheel 7 which is driven by means of ribs 6 by the shaft 5. The clutch member 1 has a groove 8, into which the end 11 of an adjusting lever 9 fulcrumed in the casing 12 takes in known manner. By moving the lever 9 by means of a shaft 10 extending outside the casing 12 the clutch member 1 can be shifted toward and away from the casing 2, whereby the casing 2 of the differential gear and consequently the differential gear itself can be fixed and released.

We claim:—

1. In a locking device for differential gearing, the combination of a divided axle, differential gearing connecting the sections of the axle including a rotatable cylindrical casing, a cylindrical clutch member entirely supported by and axially movable on the periphery of the casing, clutch teeth on the clutch member adapted to be moved into locking engagement with one of the gears of the differential.

2. In a locking device for differential gearing, the combination of a divided axle, differential gearing connecting the sections of the axle including a rotatable cylindrical casing, a cylindrical clutch member entirely supported by and axially movable on the periphery of the casing and out of engagement with the hub of the latter, said clutch member having an end wall parallel to the end of the casing, clutch teeth on said end wall projecting through the end of the casing, clutch teeth on one of the gears of the differential, means to axially slide the clutch member on the casing to move the clutch teeth into and out of engagement, and means to rotate the casing.

3. In a locking device for differential gearing, the combination of a divided axle, differential gearing connecting the sections of the axle including a cylindrical casing having vertical end walls, bearings for the casing in close proximity to said end walls, means to rotate the casing, a clutch member having a cylindrical sleeve portion slidably mounted on the periphery of the casing and having an end wall disposed at right-angles to the axis of the casing extending between the latter and one of the bearings, short clutch teeth on said end wall projecting through one end of the casing, clutch teeth on one of the gears of the differential, means within the planes of the ends of the casing adapted to axially slide the clutch sleeve on the casing to move the clutch teeth on the end wall of the sleeve into and out of engagement with the teeth on said gear.

In testimony whereof we have signed our names to this specification in the presence of two subscribing witnesses.

HEINRICH MAYER.
GUSTAV SCHLATTER.

Witnesses:
  FRANK DINNEKE,
  EMIL MEILE.